INVENTOR
HUGH B. MAY

ATTORNEYS

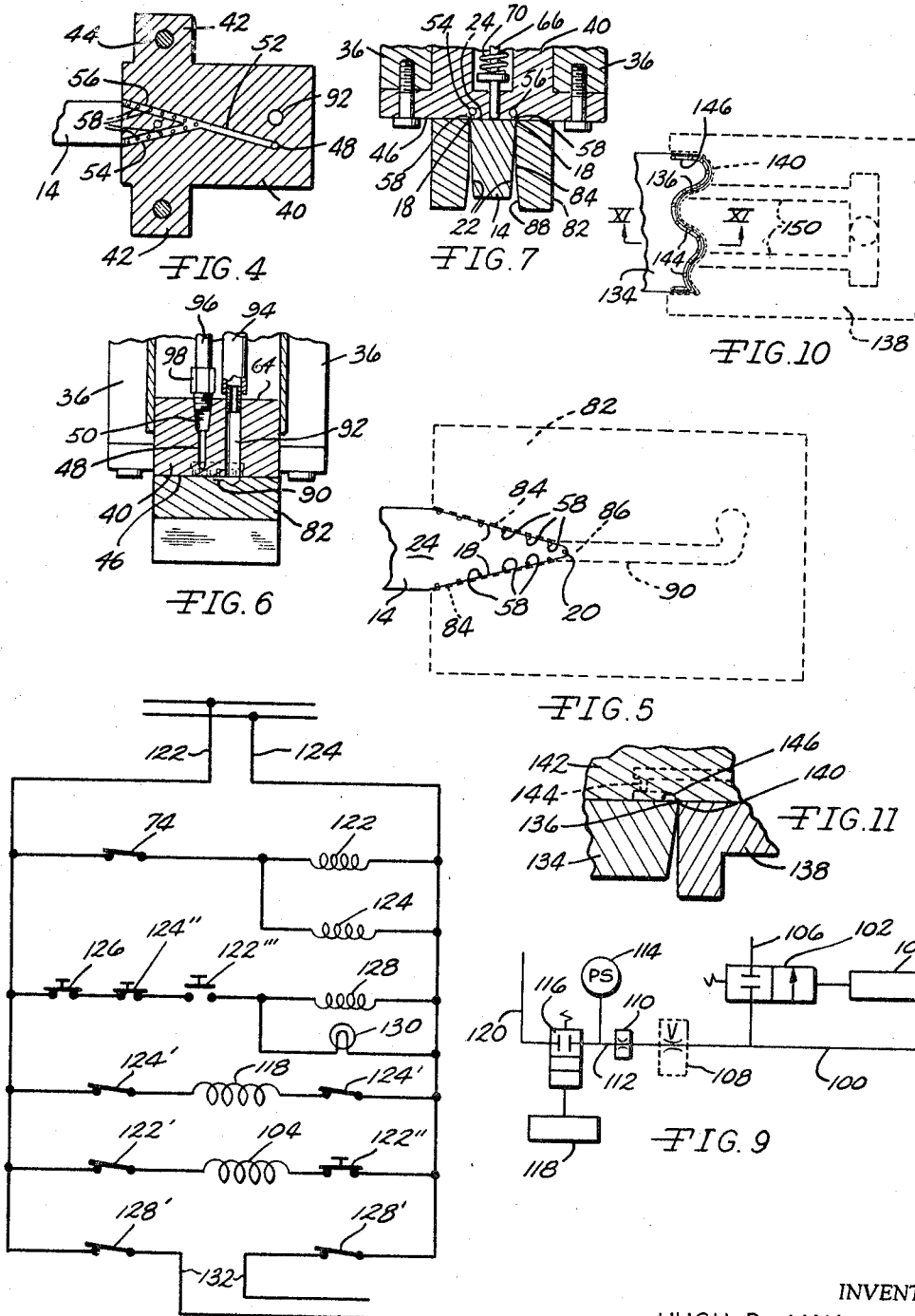

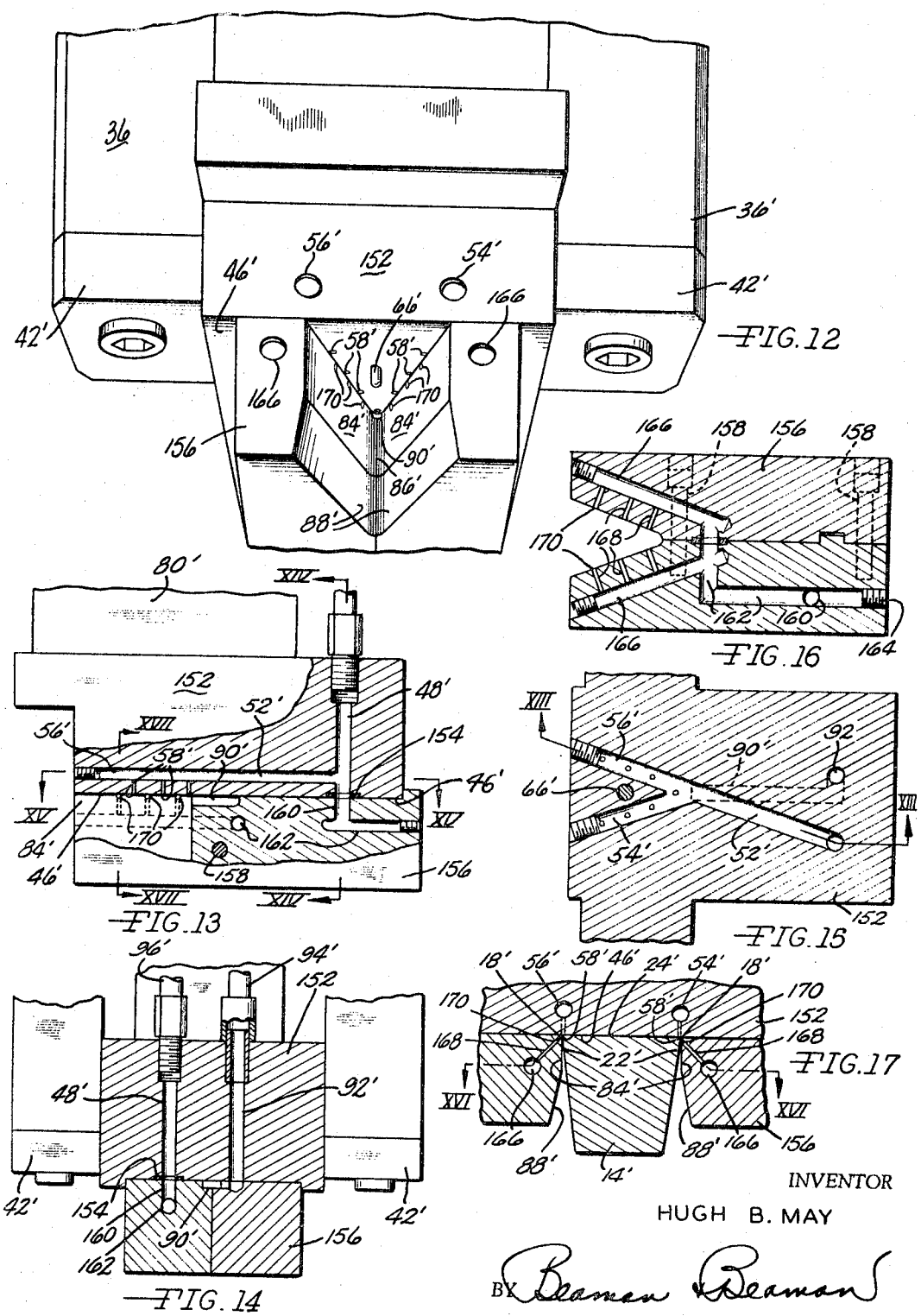

United States Patent Office 3,446,058
Patented May 27, 1969

3,446,058
TOOL WEAR-BROKEN TOOL INDICATOR
Hugh B. May, Hillsdale, Mich., assignor to Simpson Manufacturing Company, Litchfield, Mich., a corporation of Michigan
Filed May 25, 1966, Ser. No. 552,789
Int. Cl. G01b 13/08
U.S. Cl. 73—37.5        14 Claims

ABSTRACT OF THE DISCLOSURE

A tool wear-broken tool indicator which inspects a cutting tool in situ for both wear and breakage after each cycle of operation. An air inspection device is brought into engagement with the tool after the tool is withdrawn from the workpiece at the end of a working cycle. Compressed air is ejected adjacent the cutting tool edge. Sensing means are associated with the compressed air source whereby the characteristics of the cutting tool edge are determined.

---

Figure 1:
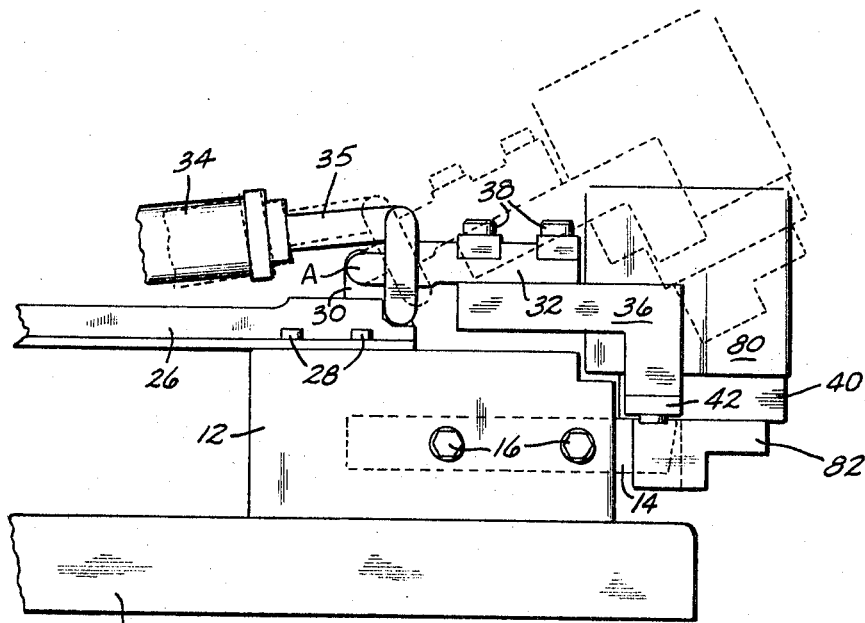

The combination of very powerful machine tools such as high speed lathes, screw machines, and the like, with heat resistant and wear resistant cutting tool alloys, permits metal to be very rapidly removed from the workpiece as compared with similar metal removing operations of a few years ago. Also, as automatic controls permit high speed machine tools to operate automatically, a single operator is often able to supervise the operation of several metal forming machines simultaneously. While the occurrence of tool breakage and wear has been substantially reduced, with respect to earlier experiences, due to improved cutting tool alloys and manufacturing techniques, the problems arising from tool wear and breakage have not been completely eliminated. In high production machines, it is the common practice to periodically replace the cutting tools after a predetermined number of working cycles regardless of the condition of the tool. Such periodic tool replacement is usually made on the "safe" side and results in considerably higher tool maintenance costs than are necessary. However, while periodic tool replacement can provide a relatively "sharp" cutting edge during the machining operations, such periodic replacement cannot prevent damage done to the workpiece and machine from the occurrence of a broken tool. Tool breakage will often result from a weakness in the tool which may not become apparent until the tool is actually used and breakage may result during the first few working cycles after a new or resharpened tool is installed.

In order to provide maximum usage from a given cutting tool, with respect to wear characteristics, and to protect against damage to the machine and workpiece resulting from a broken tool, it is a basic object of the invention to provide a tool inspection device which inspects the cutting tool in situ for both wear and breakage after each cycle of operation. To this end the invention employs an air-operated inspection device which is brought into engagement with the tool after the tool is withdrawn from the workpiece at the end of a working cycle. Compressed air is ejected adjacent the cutting edge and air pressure control and sensing means are associated with the compressed air source wherein the air pressure characteristics adjacent the cutting edge are employed to determine the condition of the tool cutting edge.

It is, therefore, an object of the invention to provide a cutting tool inspection apparatus wherein a machine-mounted cutting tool is inspected in situ after each cycle of operation for wear, breakage or other adverse condition.

Another object of the invention is to provide inspection apparatus for a machine-mounted cutting tool wherein the cutting tool is moved between operative and inoperative positions wherein the inspection apparatus is placed upon the tool when in the inoperative position and guiding means are associated therewith, whereby the apparatus is accurately related to the cutting tool during inspection.

A further object of the invention is to provide an inspection apparatus for a cutting tool having a cutting edge defined by a pair of intersecting surfaces wherein compressed air is ejected adjacent the cutting edge, and the characteristics of the cutting edge are determined by the pressure of the air being ejected adjacent the cutting edge.

Another object of the invention is to provide an inspection device for a cutting tool having a cutting edge defined by intersecting surfaces wherein a combination guide and template is employed having a form corresponding to that of the cutting tool, whereby the guide and template orients the inspection apparatus to the cutting tool and aids in the inspection of the tool upon the ejection of compressed air from ports defined in the inspection apparatus. In this manner the guide and template permits the cutting edge to be checked on both surfaces defining the cutting edge.

A further object of the invention is to provide an inspection apparatus for a cutting tool having a cutting edge wherein a contoured cutting edge of intricate configuration may be accurately inspected for wear or breakage and wherein inspection of the tool can be accurately accomplished in a short period of time.

Figure 2:
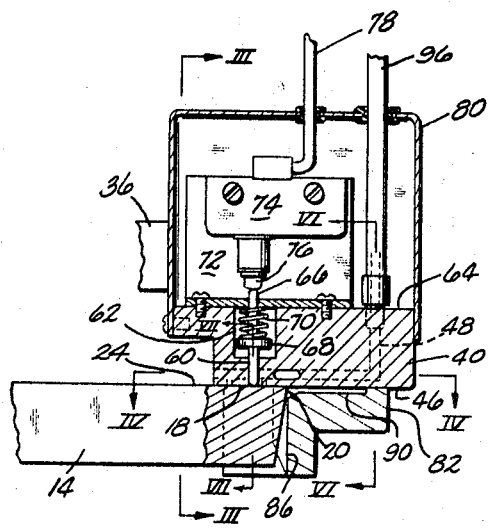
Figure 3:
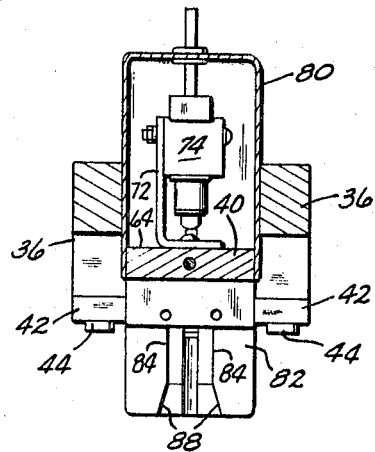

These and other objects of the invention arising from the details and relationships of the components of an embodiment thereof will be apparent from the following description and accompanying drawings wherein:

FIG. 1 is an elevational view of a machine-mounted cutting tool having an inspection device in accord with the invention mounted thereon and shown in the inspecting position in full lines, the inoperative position of the inspection apparatus being shown in the raised dotted line position, FIG. 2 is an elevational, sectional view of the inspection apparatus in accord with the invention as placed upon a tool during inspection, FIG. 3 is an elevational, sectional view of the inspection apparatus of the invention, as taken along sections III—III of FIG. 2, the tool being omitted for purposes of illustration, FIG. 4 is a plan sectional view through the body of the inspection apparatus, illustrating the compressed air passages as taken along section IV—IV of FIG. 2, FIG. 5 is a plan view of the tool of FIGS. 1 and 2 illustrating the relationship of the passage outlet ports to the cutting edge during inspection, FIG. 6 is an elevational, sectional view along section VI—VI of FIG. 2, FIG. 7 is an elevational, sectional view along section VII—VII of FIG. 2, FIG. 8 is a view of the electrical circuit employed with the invention, FIG. 9 is a representation of the air circuit employed with the invention, FIG. 10 is a plan view of a contoured cutting tool illustrating the relationship of the air passage outlet ports of an inspection apparatus employed a contoured channel intermediate the outlet ports, FIG. 11 is an elevational, sectional view of the tool of FIG. 10 and the associated inspection body and guide-template during inspection of the tool, FIG. 12 is an enlarged perspective view of a modification of the invention utilizing air passage outlet ports both above and below the tool cutting edge, FIG. 13 is an elevational, partly sectioned view of the embodiment of FIG. 12 as taken along section XIII—XIII of FIG. 15, FIG. 14 is an elevational, sectional view taken along section XIV—XIV of FIG. 13, FIG. 15 is a plan, sectional view as taken along section XV—XV of FIG. 13, FIG. 16 is a plan, sectional view taken along section XVI—XVI of FIG. 17, and FIG. 17 is an enlarged, detail, elevational, sectional view as taken along section XVII—XVII of FIG. 13 and showing a tool during inspection.

With reference to FIG. 1, the environment of the invention will be appreciated. While the invention is adaptable with several types of cutting tools common in the metal forming art, the invention is disclosed as used in conjunction with a turning tool such as would be used on a lathe, production turning machine, or screw machine. As is the usual practice, the machine with which the invention may be employed includes a tool slide 10 mounted upon conventional guideways, not shown, for movement toward and away from a revolving workpiece at the right, not shown. A tool mounting block or holder 12 is mounted upon the machine slide 10 and includes a recess in which the elongated cutting tool 14 may be received and maintained by a pair of clamping screws 16, the heads of which are shown. The cutting tool 14 is illustrated as having a V-shaped end consisting of a pair of angularly related ctting edges 18 terminating in a rounded point 20. The side surfaces 22 of the cutting tool will be slightly relieved to provide the usual clearance angle, and the surfaces 22 intersect the tool's planar top surface 24 to define the cutting edge. The tool illustrated is of the type commonly used to machine V-belt grooves in pulleys or the like, wherein a considerable amount of material is quickly removed from the workpiece.

The inspection apparatus is preferably mounted on the tool block 12. The mounting means may include an elongated bracket 26 affixed to the tool block by bolts 28. The bracket 26 includes a journal 30 in which a lever 32 is pivoted whereby the lever 32 is capable of a pivotal movement about the axis A. Pivoting of the lever 32 is accomplished by means of an expansible motor 34 which may be either of the hydraulic or air type and includes a reciprocable piston 35. The left end of the motor 34 is affixed to the left outer end of the bracket 26 at a point not shown. The inspection apparatus includes a double L-shaped support 36 affixed to the lever 32 by clamping elements 38. An inspection body 40 is affixed to the L-shaped supports 36 consisting of a substantially rectangular block having attachment portions 42, as will be apparent from FIGS. 4, 6 and 7. Bolts 44 extend through portions 42 to mount body 40 on supports 36.

The body 40 is formed with a lower planar surface 46 which is adapted to be placed upon the upper surface 24 of the tool 14 when the inspection apparatus is pivoted to the full line position of FIG. 1. The body 40 is formed with a vertically disposed passage 48 intersecting a threaded fitting bore 50, FIG. 6, and which intersects a horizontally formed air supply passage 52. The supply passage 52 communicates with a pair of air passages 54 and 56 disposed in the body 40 in a configuration corresponding to that of the tool edge configuration. Various manufacturing techniques may be employed to form the passages 48, 52, 54, and 56 in the body 40. For instance, the passages 54 and 56 may be drilled and then plugged at their outer ends with metal plugs. A plurality of outlet ports or orifices 58 are formed in the body 40 to intersect the passages 54 and 56 and the lower body surface 46. The ports 58 are so located as to be related to the cutting edge 18 of the tool adjacent the upper tool surface 24 in a manner which will be apparent from FIG. 5.

The body 40 is also formed with a bore 60 intersecting the lower surface 46 intermediate the air passage ports 58. The bore 60 intersects an enlarged chamber 62 which is open to the body upper surface 64. A plunger 66 is slideably mounted within the bore 60 and includes an enlarged head 68 received within the chamber 62. A compression spring 70 is interposed between the head 68 and a switch mounting plate 72 affixed to the upper surface 64 of the body and formed with a hole large enough to permit the upper end of the plunger 66 to extend therethrough. The plate 72 serves as an upper bearing surface for the spring 70. An electric switch 74 of the type commonly known as a "micro" switch is mounted upon the plate 72 and includes an actuating button 76 aligned with the plunger 66, whereby the switch may be actuated by reciprocal movement of the plunger. A conductor cable 78 extends from the switch 74 through a sheet metal housing 80 removably attached to the upper portion of the body 40.

A combination guide and template body member portion 82 is affixed to the lower surface 46 of the body 40 and may be considered to form a part of the body. The guide-template 82 includes a tool-receiving, V-shaped recess defined by vertically disposed surfaces 84 which are so related to each other as to correspond to the angle of the cutting tool edge 18. The surfaces 84 are represented at their uppermost portions by the dotted lines 84, as shown in FIG. 5. The surfaces 84 intersect at a concave radius 86 substantially corresponding to the radius of the tool point 20 and the surfaces 84 may be inclined at their lower regions as at 88 to facilitate entry of the tool into the guide-template 82.

A passage 90 is centrally defined in the guide-template 82 adjacent the body surface 46 and intersects the radius 86. The guide-template 82 is affixed to the body 40, preferably, by screws, not shown, whereby the guide-template portion may be replaced due to wear or damage. Compressed air is supplied to the passage 90 by means of a bore 92 defined in the body 40 intersecting surfaces 46 and 64, FIG. 6.

Compressed air is supplied to the bore 92 and the passage 90 by means of a flexible conduit 94 which extends through the housing 80. Likewise, compressed air may be supplied to the passage 48 through the flexible conduit 96 attached to fitting 98 threaded into the bore 50.

The air circuit components employed with the invention are schematically represented in FIG. 9. Clean compressed air is provided at the conduit 100 under approximately 60 p.s.i., for instance. The conduit 100 communicates with a two-way valve 102 actuated by an electric solenoid 104. In FIG. 9 the valve 102 is shown in the "off" position. Shifting of the valve 102 to the open position permits air to enter the conduit 106 which communicates with the flexible conduit 94.

The conduit 100 also supplies compressed air to an air pressure regulator 108 adapted to supply air at a known pressure condition, such as 38 pounds, to a fixed restrictor 110, which may consist of a solid body having a .042 inch diameter hole formed therein. The restrictor 110 supplies compressed air to the conduit 112 which communicates with an air pressure switch 114 such as that manufactured by the Norgren Company, Model No. 11–002–007. The pressure switch 114 includes electrical contacts which are actuated in accordance with predetermined conditions whereby the contacts will open and close at predetermined air pressure conditions within the switch. For instance, the switch 114 may be set for thirty pounds of air pressure to indicate the normal pressure conditions. Should the air pressure air within the switch become less than thirty pounds during testing of the tool by the amount of pressure constituting the sensitivity of the switch, for instance, two or three pounds, the electrical contacts of the switch will be actuated.

Conduit 112 also supplies air to a two-way valve 116 actuated by solenoid 118. The solenoid 118 controls the flow of the air into the conduit 120 supplying the air passages supply conduit 96.

The electrical circuitry employed with the invention is shown in FIG. 8. The electric circuit is supplied by a pair of supply conductors 122 and 124. The switch 74 is normally closed and is connected in series with a pair of time delay switch relays 122 and 124 such as those manufactured by the Square D Company, Class 9050, Type BO 3D Series "C." Switch 122 includes auxiliary contacts 122' which are normally open, a time delay contact 122" which opens about one second after 122 is energized and a contact 122''' which closes about one second after 122 is energized. Switch 124 includes normally open auxiliary contacts 124' and normally open contacts 124" which closes about two seconds after 124 is energized. The contacts for the pressure switch 114 are indicated at 126, and this switch is in series with the contacts of timer switch 122, timer switch 124, and the relay 128. Relay 128 may be of the type manufactured by the Square D Company, Class 8501, Type Ac-20, Series B. Also, an indicating light 130 may be connected parallel with the relay 128. The normally closed contacts 128' of relay 128 control the energization of conductors 132 which lead to the motor control of the machine with which the cutting tool 14 is associated.

The operation of the tool inspection apparatus in accord with the invention will now be described:

During each cycle of operation and use of the cutting tool 14, the machine slide 10 moves between an inoperative position remote from the workpiece, as shown in FIG. 1, and an operative position wherein the cutting tool will be engaging the workpiece. While the tool is engaging the workpiece, the expansible motor 34 will be energized to retract the piston 35 to swing the lever 32 to its upper position, as shown in dotted lines in FIG. 1. In this position, the inspection apparatus body 40 and associated components will be held remote from the cutting tool 14, whereby the cutting tool may engage the workpiece and perform its cutting operation. Upon the tool slide 10 being moved to its inoperative position by the usual tool slide operating mechanism, a switch, not shown, is actuated which in turn energizes a valve to actuate the motor 34 to extend the piston 35 and swing the lever 32 in a clockwise direction to place the inspection body surface 46 upon the upper surface 24 of the tool in the manner shown in FIG. 2. As the lever 32 is moving from the dotted line position of FIG. 1 to the full line position thereof, the fact that the guide-template 82 is open at its lower end permits the tool to be received in the guide-template, and the tapered surfaces 88 aid entry of the tool into the guide-template. The guide-template radius 86 will engage the point 20 of the tool and as the surfaces 84 closely conform to the cutting edges 18 of the tool, the tool will be closely received within the guide-template and, thus, the inspection apparatus will be very accurately related to the cutting tool. As the body 40 is being swung down upon the cutting tool, the plunger 66 which will be extending below the surface 46 due to the biasing action of the spring 70, will engage the upper surface 24 of the cutting tool before the surface 24 engages the lower surface 46 of the body. When the lower end of the plunger engages the tool surface 24, the normally closed switch 74 will be opened causing the de-energization of time switches 122 and 124. The de-energizing of switch 122 closes contact 122' which energizes solenoid 104 to move the valve 102 to the left, FIG. 9. Such movement of the valve 102 causes compressed air to be introduced into the passage 90 through the conduits 106 and 94. The compressed air entering the passage 90 is ejected adjacent the body lower surface 46 as the tool approaches this surface. Thus, any metal chips, or other foreign matter, deposited on the upper surface 24 of the tool will be blown therefrom, and a clean upper tool surface will be assured during the inspection procedure. The contact 122' remains closed for approximately one second to produce the tool-cleaning operation.

Approximately at the end of the time that solenoid 104 is permitting compressed air to be blown across the top of the tool, the tool surface 24 will engage the body surface 46. When contact 122' opens, the solenoid 104 is de-energized and air flow in passage 90 ceases. The ports or orifices 58 defined in the body 40 are so located that they form outlets for the air passages 54 and 56 which are disposed adjacent the tool cutting edges 18 and point 20. The exact location of the orifices 58 with respect to the cutting edges 18 during inspection will vary according to the particular wear tolerances desired. Also, the size of these orifices will be dependent to some extent on the wear tolerances permissible. However, in most cases the orifices 58 will be disposed very closely to the cutting edges 18 whereby wear of the cutting edge to the extent of two or three thousandths of an inch will be noticeable with respect to the amount of air able to pass from the orifices.

De-energization of time switch 124 by switch 74 closes contacts 124' to energize solenoid 118 and shift the valve 116 to the position permitting pressurized air to enter the conduits 120, 96 and air passages 52, 54, and 56 to flow from the orifices 58. Timer 124 includes normal open contact 124" connected in series with the pressure switch contacts 126. The contacts 122''' will be closed and the pressure switch contacts 126 will normally be closed, and it is necessary that sufficient resistance to air flow from the orifices 58 be established to permit air pressure to build up in the air passages 52, 54, and 56 and conduits 96 and 120 to open the pressure switch contacts 126. If the cutting tool edge has been sufficiently worn as to permit an excessive amount of air to escape from the orifices 58, the pressure switch contacts 126 will not open before the two-second delay before contact 124" closes and the relay 128 and light 130 will be energized. Energization of the relay 128 will open contacts 128' to de-energize the motor which rotates the workpieces being machined by the tool, and the flash of light 130 will indicate to the operator that the cutting tool 14 needs replacement. If the cutting edge has been broken during the previous cutting cycle, such a tool defect will also permit excessive air flow from the adjacent air passage orifices 58 and, thus, indicate the necessity for tool replacement.

If, during the gauging operation, the tool has not broken or worn to the point whereby the air pressure cannot be maintained within the air passages and conduits 96, 120, and pressure switch 114, the air pressure within the pressure switch 114 will build up to the predetermined value and open the contacts 126 before the contacts 124" close to prevent relay 128 being energized. Under such normal conditions, the tool slide 10 will move toward its operative position under the influence of the normal machine tool slide operating mechanism, and the switch, not shown, controlling expansible motor 34 will be actuated to operate the motor and retract the piston 35 to pivot the inspection body 40 to the dotted line position shown in FIG. 1, and the cutting tool may perform its next cutting operation. Switch 74 is closed as the body 40 is raised energizing switches 122 and 124 preparing the circuit for the next inspection cycle.

With the inspection device of the invention, cutting tools of unusual or contoured configuration can be inspected in the manner described. In FIG. 10, a cutting tool 134 is shown in plan view having a contoured cutting edge 136. The configuration of the guide-template 138, which would be employed with this cutting tool, is shown in dotted lines and would include a contoured edge 140 disposed adjacent the contoured cutting tool edge 136. The inspection body 142 would include a plurality of ports 144 located adjacent the contoured tool edge 136 whereby the tool edge can be inspected in the manner identical to the previously described cutting tool configuration. In order to provide even a greater degree of sensitivity to cracks and other defects or wear which may occur in the tool edge, the underside of the body 142 may be provided with a groove 146 defined in the lower body surface 148 which communicates with the air passage outlet orifices 144. The groove 146 would be of a configuration closely conforming to that of the cutting edge 136 and would be disposed very closely to the tool edge, as is apparent from FIG. 11. In the embodiment of FIGS. 10 and 11, the "cleaning" air passages defined in the guide-template 138 may be related as indicated in dotted lines at 150. The inspection body 142, guide-template 138, and other components operate and are employed in the manner described above, and the groove or channel 146 permits a "continuous" inspection of the length of the tool edge. With the embodiment of FIGS. 10 and 11, only a few orifices 144 need communicate with the passage as the groove 146, rather than the ports 144, "feels" the tool edge.

The embodiment of FIGS. 12 through 17 is basically similar to the apparatus of FIGS. 1 through 9 and similar components are indicated by primes. However, in FIGS. 12 through 17 means are provided for gauging the side surfaces 22' of the tool 14' adjacent the cutting edges 18', as well as gauging the tool top surface 24' adjacent the cutting edges.

In FIGS. 12 through 17, the body 152 is substantially identical to the body 40 except that the passage 48' extends downward beyond the air supply passage 52' and intersects the lower surface 46'. A recess is defined in the body 152 intersecting surface 46' in which a gasket 154 is received which circumscribes the passage 48'.

The guide-template portion 156 of the body 152 is formed of two pieces, for purposes of manufacture, interconnected by bolts 158. The guide-template is mounted on the lower surface 46' of body 152 and includes a tool-receiving, V-shaped recess defined by surfaces 84', a radius 86' and inclined surface 88'. A passage 90' is formed in the upper surface of guide-template 156 communicating with the V-shaped, tool-receiving recess at the radius 86' and being supplied with air from the bore 92' defined in the body 152. The bore 92' receives compressed air from the conduit 94' as the gauging apparatus is being placed on the tool.

The guide-template is provided with a passage 160 which communicates with the passage 48', FIG. 13. The passage 160 supplies gauging air to the passage 162, which is plugged at 164, and supplies air to the branch passages 166 defined in the guide-template on opposite sides of the tool-receiving recess. The passages 166 are plugged at their outer ends. A plurality of bores 168 are formed in the guide-template 156 communicating with the branch passages 166 at one end and intersecting the tool recess surfaces 84' slightly below the surface 46' at the other end to define orifices or ports 170.

The apparatus of FIGS. 12 through 17 is employed in the same manner as the embodiment of FIGS. 1 through 9. When the body 152 and guide-template 156 are lowered on a tool 14', the engagement of the plunger 66' with the tool will cause a blast of compressed air to be ejected through passage 90' to clean the tool upper surface. Thereupon, the upper surface of the tool will engage the surface 46' and the tool edges 18' will be disposed immediately below the ports 58'. The ports 170 are disposed immediately below and adjacent the tool edges 18'. Upon a gauging air pressure being supplied to conduit 96' air will be supplied simultaneously to ports 58' and 170 and if top wear, or a break, has occurred at the edges 18', this condition will be sensed by the excessive escape of air through ports 58' while the presence of side wear, or breakage, of the tool adjacent edges 18' will be sensed by the excessive escape of air through ports 170. Thus, the ports 170 permit the side walls of the tool 14' to be sensed accurately and the use of ports 58' and 170 senses the characteristics of the tool edges on both the top and sides to provide a complete evaluation of the critical portions of the tool.

As the invention permits the cutting tool 14 to be inspected in situ, maximum tool use can be made from each cutting tool and, in the absence of tool breakage, the tool may continue to be used until a predetermined amount of wear has occurred. By the adjustment of the pressure switch 114, the degree of air pressure loss acceptable, which indicates the degree of wear, may be regulated. By automatically stopping the machine with which the cutting tool is employed in the event of excessive wear or tool breakage, maintenance and downtime is minimized. The use of the invention permits one operator to safely operate several automatic machine tools. The apparatus may be readily adjusted in accordance with the conditions desired, due to the ease with which the pressure switch may be adjusted. The accuracy provided by the inspection system is determined by the sensitivity of the pressure switch.

It is appreciated that various modifications to the invention may be apparent to those skilled in the art without departing from the spirit and scope thereof and it is intended that the invention be defined only by the scope of the following claims.

I claim:
1. Cutting tool inspection apparatus for a machine-mounted cutting tool in operating situ comprising, in combination,
   (a) a machine tool having a tool slide movable between a first non-cutting position and a second cutting position,
   (b) a cutting tool having a cutting edge defined by intersecting tool surfaces mounted upon said tool slide for movement therewith,
   (c) an inspection body mounted on said tool slide having a surface adapted to be disposed adjacent the tool to be inspected,
   (d) an air passage defined in said body surface adapted to be located adjacent the tool cutting edge during inspection of the tool,
   (e) means supplying compressed air under predetermined pressure conditions to said air passage, and
   (f) sensing means sensing the pressure of said compressed air during inspection of the tool, whereby characteristics of the tool adjacent its cutting edge are sensed.

2. A cutting tool inspection apparatus as in claim 1 wherein:
   (a) a plurality of air passages are defined in said body intersecting said body surface and adapted to be spaced adjacent the tool cutting edge during inspection of the tool, said passages being positioned on said body surface in a configuration substantially corresponding to that of the tool cutting edge.

3. A cutting tool inspection apparatus as in claim 1 wherein:
   (a) said air passage is of an elongated configuration substantially corresponding to the configuration of the tool cutting edge.

4. In a cutting tool inspection apparatus as in claim 1:
   (a) means movably supporting said inspection body upon said tool slide for movement between a first position removed from the cutting tool and a second position disposing said body adjacent the cutting tool.

5. A cutting tool inspection apparatus as in claim 4:
   (a) an inspection body orientation guide portion defined on said body, said guide portion including tool-engaging surfaces adapted to engage the cutting tool and orient said body with respect to the cutting tool upon said body being moved to said second position.

6. A cutting tool inspection apparatus as in claim 5 wherein:
   (a) said guide tool-engaging surfaces are so related on said guide as to closely conform to the tool cutting edge.

7. In a cutting tool inspection apparatus as in claim 1:
   (a) means movably supporting said inspection body upon said tool slide for movement between a first position removed from the cutting tool and a second position disposing said body adjacent the cutting tool, and
   (b) means sensing positioning of said body to said second position.

8. In a cutting tool inspection apparatus as in claim 7:
(a) said means sensing said positioning of said body to said second position includes a switch mounted on said body, said switch controlling energization of said means supplying compressed air to said air passage, and
(b) a switch actuator movably mounted on said body operably connected to said switch and adapted to engage and be operated by the tool upon movement of said body to said second position.

9. A cutting tool inspection apparatus as in claim 7 wherein:
(a) a cutting tool cleaning passage for compressed air is formed in said inspection body,
(b) a compressed air source selectively communicating with said cleaning passage,
(c) control means regulating the flow of compressed air in said cleaning passage,
(d) said means sensing positioning of said body to said second position operating said control means.

10. A cutting tool inspection apparatus as in claim 1 wherein:
(a) said inspection body includes a first surface adapted to be disposed adjacent one of the cutting edge defining surfaces of the cutting tool and includes a second surface adapted to be disposed adjacent the other of the cutting edge defining surfaces of the cutting tool, and
(b) an air passage defined in each of said surfaces, each air passage adapted to be located adjacent the tool cutting edge during inspection of the tool.

11. The method of inspecting a machine-mounted cutting tool in operating situ, the tool including a cutting edge defined by intersecting surfaces and mounted on the machine for movement between operative and inoperative cutting positions by inspection apparatus including a body having a compressed air passage having an outlet defined therein comprising the steps of:
(a) moving the cutting tool to the inoperative position,
(b) placing the inspection apparatus body adjacent the tool while the tool is in the inoperative position disposing the air passage outlet adjacent the tool cutting edge whereby the tool cutting edge configuration at least partially determines the characteristics of the air passage outlet,
(c) supplying compressed air at a predetermined pressure to the air passage,
(d) sensing the air pressure within said air passage to determine the condition of the cutting edge, and
(e) removing the inspection apparatus from the tool.

12. The method of inspecting a machine-mounted cutting tool as in claim 11 including the additional step of:
(a) cleaning the cutting tool prior to placing the inspection apparatus adjacent the tool.

13. The method of inspecting a machine-mounted cutting tool as in claim 11 wherein the machine is powered comprising the additional step of:
(a) automaticaly de-energizing the machine upon which the cutting tool is mounted upon the sensing of the air pressure within the air passage indicating a predetermined air pressure condition.

14. Inspection apparatus for a cutting tool having a cutting edge defined by intersecting top and side surfaces comprising, in combination,
(a) an inspection body having a tool orientation surface defined thereon adapted to be engaged by the top surface of the cutting tool during inspection of the tool,
(b) a guide-template portion defined on said inspection body, said portion including tool-guiding surfaces adapted to be disposed adjacent the tool side surfaces and adjacent the tool cutting edge during inspection of the tool,
(c) a plurality of air-passage ports defined in said tool guiding and orientation surfaces adapted to be disposed adjacent the tool side and top surfaces, respectively, adjacent the tool cutting edge during inspection of the tool,
(d) means supplying compressed air under predetermined pressure conditions to said air-passage ports, and
(e) sensing means sensing the pressure of said compressed air during inspection of the tool, whereby characteristics of the tool adjacent its cutting edge are sensed.

References Cited

UNITED STATES PATENTS

| | | | |
|---|---|---|---|
| 2,779,188 | 1/1957 | Meyer | 73—37.8 |
| 3,353,402 | 11/1967 | Caligiuri | 73—37.5 |

LOUIS R. PRINCE, *Primary Examiner,*

WM. HENRY II, *Assistant Examiner.*